United States Patent
Bergua

(10) Patent No.: US 10,774,893 B2
(45) Date of Patent: Sep. 15, 2020

(54) TUNED MASS DAMPERS FOR DAMPING AN OSCILLATING MOVEMENT OF A STRUCTURE

(71) Applicants: GE Renewable Technologies Wind B.V., Breda (NL); General Electric Renovcables Espana, S.L., Barcelona (ES)

(72) Inventor: Roger Bergua, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 28 days.

(21) Appl. No.: 16/003,509

(22) Filed: Jun. 8, 2018

(65) Prior Publication Data
US 2018/0355936 A1   Dec. 13, 2018

(30) Foreign Application Priority Data
Jun. 13, 2017   (EP) .................................... 17382362

(51) Int. Cl.
```
F16F 7/10      (2006.01)
F16D 59/00     (2006.01)
F03D 13/25     (2016.01)
F03D 80/00     (2016.01)
F03D 1/00      (2006.01)
```
(52) U.S. Cl.
CPC ................. *F16F 7/10* (2013.01); *F03D 1/00* (2013.01); *F03D 13/25* (2016.05); *F03D 80/00* (2016.05); *F16D 59/00* (2013.01); *F05B 2240/912* (2013.01); *F05B 2240/95* (2013.01); *F16F 2222/08* (2013.01); *F16F 2230/0052* (2013.01)

(58) Field of Classification Search
None
See application file for complete search history.

(56) References Cited

U.S. PATENT DOCUMENTS

| | | | | |
|---|---|---|---|---|
| 5,421,129 A | * | 6/1995 | Sakamoto | E04B 1/985 188/378 |
| 6,672,837 B1 | * | 1/2004 | Veldkamp | F16F 7/10 416/144 |
| 9,683,556 B2 | * | 6/2017 | Ollgaard | F03D 80/00 |

(Continued)

FOREIGN PATENT DOCUMENTS

| | | |
|---|---|---|
| DE | 10 2011 107 479 A1 | 1/2013 |
| EP | 2 746 483 A1 | 6/2014 |

(Continued)

OTHER PUBLICATIONS

Jurgen, EP2746483 english machine translation.*

(Continued)

*Primary Examiner* — Kenneth J Hansen
*Assistant Examiner* — Jason Fountain
(74) *Attorney, Agent, or Firm* — Dority & Manning, P.A.

(57) ABSTRACT

A tuned mass damper for damping an oscillating movement of a structure along a first direction is provided. The tuned mass damper comprises a mass arranged to perform a reciprocating movement along the first direction in response to the oscillating movement of the structure, wherein the mass comprises a braking mechanism configured to at least partially brake the movement of the mass along the first direction when the mass exceeds a predefined speed.

12 Claims, 6 Drawing Sheets

(56) References Cited

U.S. PATENT DOCUMENTS

| | | | |
|---|---|---|---|
| 10,208,818 B2 * | 2/2019 | Jacobson | F16D 59/00 |
| 2013/0280064 A1 | 10/2013 | van Steinvoren | |
| 2018/0135708 A1 * | 5/2018 | Jacobson | F16D 59/00 |
| 2019/0063063 A1 * | 2/2019 | Mechineau | F03D 13/20 |

FOREIGN PATENT DOCUMENTS

| | | |
|---|---|---|
| GB | 203319 A | 8/1924 |
| WO | 2017/036581 A1 | 3/2017 |

OTHER PUBLICATIONS

Ulrich, DE 102011107479 english machine translation.*
Extended European Search Report and Opinion issued in connection with corresponding EP Application No. 17382362.6 dated Jan. 25, 2018.

* cited by examiner

TUNED MASS DAMPERS FOR DAMPING AN OSCILLATING MOVEMENT OF A STRUCTURE

The present disclosure relates to tuned mass dampers for damping an oscillating movement of a structure. The present disclosure further relates to wind turbines comprising such tuned mass dampers.

BACKGROUND

A tuned mass damper, also known as a harmonic absorber, is a device mounted in structures to reduce the amplitude of structural vibrations. The application of such tuned mass dampers can prevent discomfort, damage, or outright structural failure depending on the application. Tuned mass dampers are used to stabilize structures and protect against violent motion caused by harmonic vibration. A tuned mass damper aims at reducing the vibration of a structure with a comparatively lightweight component so that the worst-case vibrations become less intense. Structures employing tuned mass dampers are tuned to either move the main mode away from a troubling excitation frequency, or to add damping to a resonance that is difficult or expensive to damp directly.

Tuned mass dampers are typically attached to a structure at an effective position to counteract the system's vibration. A basic tuned mass damper comprises a mass that is attached to the vibrating structure via a suspension element, which typically consists of a spring and a damper, thus changing the vibrating characteristics of the vibrating structure.

The mass damper is tuned to the vibrating structure such that the mass and the stiffness of the suspension element are selected to provide an appropriate counterforce to the disturbing excitation force. In particular, the mass ratio, i.e. the relativity of mass between the tuned mass damper mass and the vibrating structure, and the tuning frequency of the mass damper may be specifically calculated.

Dampers are frequently used in e.g. wind turbines, power transmission structures, automobiles and buildings which are subjected to vibratory excitations that may cause the structure to vibrate at a predetermined frequency. Vibratory oscillations of these and other structures can cause inaccuracies in equipment associated therewith and fatigue damage to the structures.

Particularly in wind turbines, parts of the wind turbine e.g. a wind turbine tower structure may undergo undesired vibrations, i.e. oscillatory or repeating displacements in any direction (fore-aft vibrations, side-to-side or lateral vibrations, longitudinal vibrations, torsional vibrations, etc.) of different amplitudes and frequencies (high or low, constant or varying) during operation. These vibrations may be caused by different factors, e.g. wind acting on the tower, blades passing along the tower and locally disturbing the wind flow, vibrations transmitted from the gearbox to the tower, rotor movements, nacelle imbalances, vibrations from the hub transmitted to the tower etc.

Additionally, structures of offshore wind turbines are subject to several loads, such as for example impacts, forces exerted by waves, currents and tides. In the presence of such loads offshore wind turbines may have a tendency to destabilize. Particularly, these loads may induce side-to-side motions which may not be properly damped by traditional aerodynamic damping mechanisms such as e.g. pitching. Furthermore, offshore wind turbine towers may be higher, and therefore more prone and sensitive to oscillations, than onshore wind turbine towers.

If a tower is subjected to vibrations during a prolonged period of time, fatigue damage may result. Fatigue damage may lead to a reduced life time of the wind turbine tower and/or its components. Furthermore, a danger exists that when vibrations cause resonance in the wind turbine tower, this can lead to a potentially dangerous increase of the vibrations. A further complicating factor is that the size of wind turbines (rotor, nacelle, tower, etc.) keeps increasing. Also, as towers become higher, the effect of vibrations becomes more critical.

Tuned mass dampers may be placed in confined spaces e.g. the above-commented wind turbine towers. However, these tuned mass dampers can present problems such as large excursions in case of extreme load cases which may lead to an impact of the tuned mass damper with the surroundings. In fact, a possible stroke of the tuned mass damper against the confined spaced where the tuned mass damper is placed is one of the major concerns for the designers. An impact of the tuned mass damper during normal operation or extreme events may damage the tuned mass damper, the surroundings of the tuned mass damper and it may go in detriment of the tuned mass damper performance e.g. detuning the tuned mass damper.

SUMMARY

In a first aspect, a tuned mass damper for damping an oscillating movement of a structure along a first direction is provided. The tuned mass damper comprises a mass arranged to perform a reciprocating movement along the first direction in response to the oscillating movement of the structure, wherein the mass comprises a braking mechanism configured to at least partially brake the movement of the mass along the first direction when a predefined speed of the mass is exceeded.

According to this first aspect, a braking mechanism that is configured to the function of damping a tuned mass damper in case of extreme loads is provided. "Damping a tuned mass damper" as used herein may be regarded as "slowing down a tuned mass damper" or "limiting the displacement of a tuned mass damper". The braking mechanism may be able to extract energy from the tuned mass damper to limit the excursions of the tuned mass damper in case of the extreme loads. This way, the risk of an impact of the tuned mass damper against the structure to be controlled in case of such extreme loads situations is avoided. Consequently, a possible damage to the structure and the tuned mass damper itself may also be avoided.

Moreover, the braking mechanism may be configured to actuate only in case of extreme loads acting on the structure and thus when the speed of the tuned mass damper associated with the movement of the mass is relatively high.

In summary, the inclusion of a braking mechanism in a tuned mass damper can provide a cost-effective and reliable solution to avoid large excursions of the tuned mass damper.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Throughout the present description and claims the term "centrifugal brake" may be defined as a braking mechanism configured to at least partially brake the movement of a mass forming part of a tuned mass damper when a predefined speed of the mass is exceeded. In particular, the braking mechanism may be configured to at least partially brake the movement of the mass forming part of a tuned mass damper when a predefined rotational speed of an element forming part of the braking mechanism is exceeded.

Figure 1:
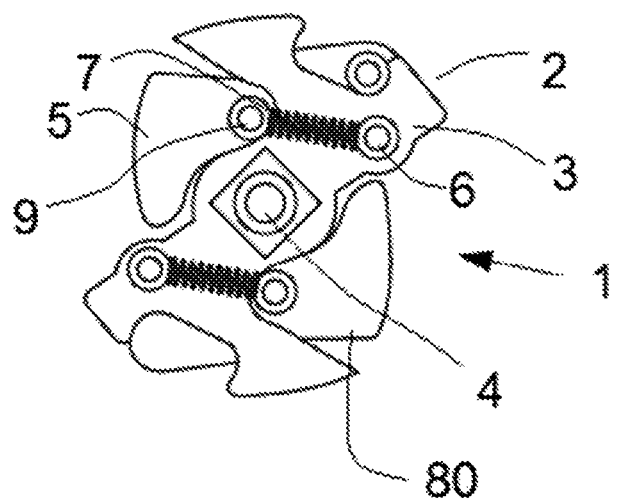
FIGS. 1-2 show longitudinal cross-sectional views of an example of a centrifugal brake which may be used in tuned mass dampers according to the various examples disclosed herein.
Figure 2:
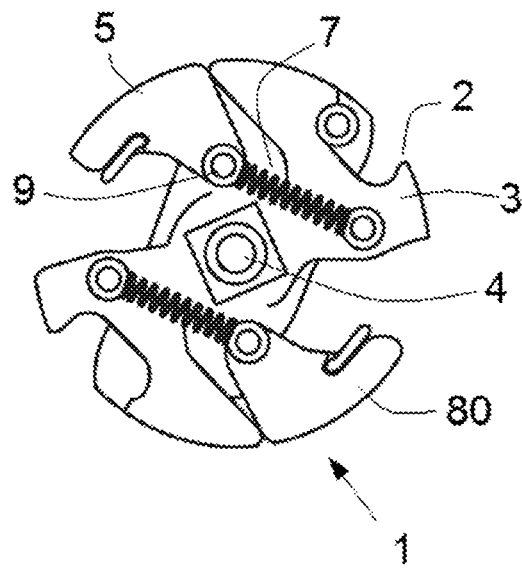

FIGS. 1-2 show longitudinal cross-sectional views of an example of a brake that is configured to exert a braking force when a speed is exceeded. FIG. 1 shows a passive braking mechanism, in particular a centrifugal brake 1. In other examples, the braking mechanism may be an active mechanism configured to act when a speed is exceeded.

The centrifugal brake of FIG. 1 may comprise a rotating assembly 2 constrained to rotate about an axis. The rotating assembly 2 may comprise a chassis 3 with a central shaft 4. The chassis 3 may further comprise a brake shoe 5 pivotally coupled to the chassis 3 using a pin 6. In some examples, the brake shoe 5 may carry a pad (not shown) of composite brake liner or other suitable material on its outer surface. Throughout the present description and claims the term "shoe" or "brake shoe" is used to describe a moveable element or assembly that presents a braking surface, and may be configured to brake or slow down the rotating assembly forming part of the centrifugal brake.

In a first "armed" position shown in FIG. 1, the shoe 5 is connected to the pin 6 using a spring 7. Springs of all different characteristics and sizes are readily available and easily mountable. In this "armed" position there is substantially no contact between the shoe 5 and a braking surface. However, as the rotating assembly 2 is rotated at an increasing speed, the force on the spring 7 increases, due to the centripetal acceleration of the brake shoe 5. At the desired engagement speed of the brake shoe 5, the shoe 5 may be forced outwards about a pivot 9, into the "engaged" position shown in FIG. 2.

In the engaged position shown in FIG. 2, the shoe 5 (or shoe pad if present), may contact a non-rotating part e.g. a braking surface and it may slowdown the rotating assembly 2 by mechanical friction. The centrifugal brake 1 may remain in the "engaged" configuration until the rotating assembly 2 is rotated at a decreasing speed. As the rotating assembly 2 is rotated at a decreasing speed, the force acting on the spring 7 decreases and the shoe 5 is forced back into the "armed" position shown in FIG. 1. The centrifugal brake 1 may be provided with a further brake shoe 80. The structure and operation of the brake shoe 80 may be substantially the same as the brake shoe 5. In some other examples, additional brake shoes may be foreseen. The desired or selected engagement or deployment speed may be modified in several ways. For example, the pin 6 may be more heavily spring loaded by increasing the spring constant of spring 7, to increase the rotational speed of engagement. The engagement speed may also be increased by reducing the weight of the shoe 5. In any event, the force on the spring 7 due to the centripetal acceleration should be sufficient to provide adequate force on the shoe 5 in order to slow down the rotating assembly 2 when shoe 5 engages a braking surface e.g. a braking surface on a rail or a non-rotating part, for example, a drum.

The spring 7 can also be adjusted in different ways. For example, the restraining force of the spring 7 may be modified. This way, the spring 7 may be configured to withstand a predetermined force associated with a predetermined rotational speed of the rotating assembly 2. However, when this predetermined rotational speed is overcome by the rotation assembly 2 (and thus the force that the spring can withstand without deforming is exceeded), the shoe 5 may be deployed to contact a braking surface e.g. a braking surface arranged with the mass of the tuned mass damper. The centrifugal brake 1 may thus be adjusted to slow down the assembly 2 by frictional contact of the shoe 5 with a braking surface only above a certain desired engagement rotational speed value.

In further examples, the centrifugal brake 1 may act against the corresponding braking surface progressively since the force applied by the brake shoe 5 of the centrifugal brake 1 at the "engaged" position to the corresponding braking surface may be proportional to the rotational speed acting on the rotating assembly 2 of the centrifugal brake. With such an arrangement, a relatively smooth actuation of the centrifugal brake 1 in order to slow down e.g. a tuned mass damper in case of extreme loads acting on the structure to be controlled may be achieved.

The centrifugal brake 1 may be provided with high resistance to corrosion (which can be particularly useful for offshore applications), stiction, and other failure modes, such that the centrifugal brake 1 may be expected to operate reliably even after many years in service. These features may be especially advantageous for use in a tuned mass damper located in a wind turbine e.g. the tower of a wind turbine, which typically are expected to operate reliably for decades.

In alternative examples, a frictional centrifugal brake (for example, the one illustrated in FIGS. 1 and 2) may alternatively or additionally be provided with magnetic elements. The magnetic elements may be provided e.g. at or near the shoe 5. Thus, as the rotating assembly 2 is rotated at an increasing speed, the force on the spring 7 increases, due to the centripetal acceleration of the brake shoe 5 and a further magnetic force provided by the magnets. The performance of the centrifugal brake in order to slow down the rotating assembly 2 when shoe 5 engages a braking surface e.g. a braking surface on a rail or a drum may thus be improved.

Figure 3:
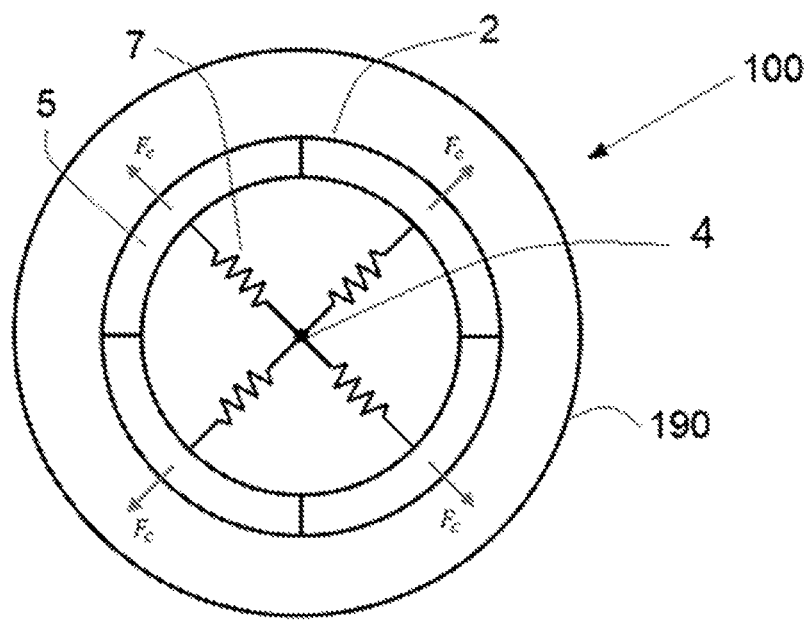
FIG. 3 shows a longitudinal cross-sectional view of another example of a centrifugal brake which may be used in tuned mass dampers according to the various examples disclosed herein.

FIG. 3 shows a longitudinal cross-sectional view of another example of a centrifugal brake which may be used in tuned mass dampers according to the various examples disclosed herein. FIG. 3 shows a centrifugal brake 100. Similarly as before, as the rotating assembly 2 is rotated at an increasing speed when coupled to a moving body, e.g. a mass in oscillation forming part of a tuned mass damper, the force (Fc) on the spring 7 increases, due to the centripetal acceleration of the brake shoe 5. The operative connection between an oscillating mass and the rotating assembly of the centrifugal brake may be provided e.g. by a shaft 4 that rotates when the mass is moving.

At the desired engagement speed of the brake shoe 5, the shoe 5 may be forced sufficiently outwards due to the centrifugal force such that an "engaged" position can be reached. In the "engaged position" (not shown), the shoe 5 may contact a non-rotating part 190 e.g. a drum and it may slow down the rotating assembly 2 by mechanical friction.

Figure 4:
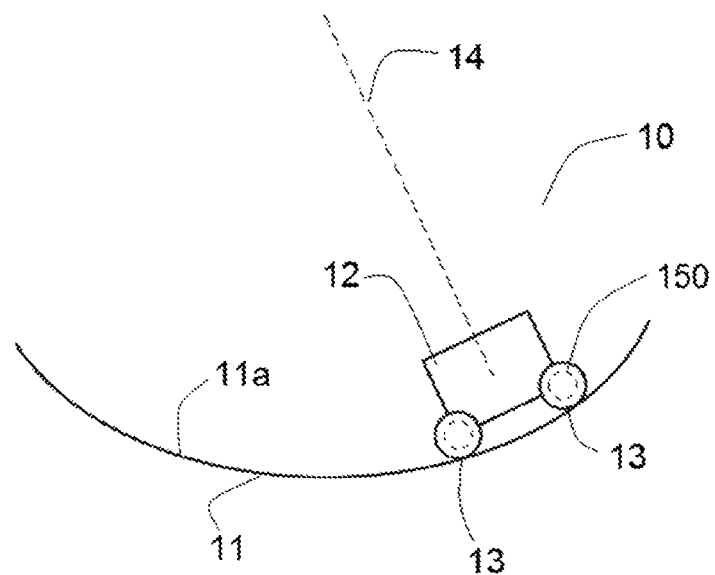
FIG. 4 schematically illustrates an example of a tuned mass damper including a centrifugal brake.

FIG. 4 schematically illustrates an example of a tuned mass damper including a centrifugal brake. The centrifugal brake used in the example of FIG. 4 may be the same or similar to the examples of a centrifugal brake shown in FIGS. 1-3. A tuned mass damper 10 is provided. The tuned mass damper 10 e.g. a rolling tuned mass damper may comprise a suspended mass 12 and rotating elements 13 e.g. rollers attached to the mass 12. The rollers 13 may be mounted on shafts (not shown) attached to the mass 12. Therefore, the mass 12 may be configured to perform a reciprocating movement along a first direction over the guide 11 using the rotating elements 13 in response to oscillating movements in the first direction of a vibrating structure which are to be dampened.

The tuned mass damper 10 further comprises the above-commented guide 11 forming a rolling path in a first direction. The guide 11 may further comprise a braking surface 11a. The guide 11 may be in the form of an arc of a predetermined radius of curvature in a longitudinal direction i.e. the first direction of movement of the mass arranged to perform a reciprocating movement in response of oscillations of the structure to be controlled.

The guide 11 may be fixed to the structure to be controlled e.g. an inner surface of a wind turbine tower's sidewall using e.g. bolts or welding. In some examples, the guide may comprise a pair of parallel channels (not shown), on which the tuned mass damper 10 may roll using the rotating elements 13.

In summary, the guide 11 may provide a platform on which the rotating elements 13 may be rolled. The action of gravity provides an effective stiffness (i.e., the "spring" element") that tends to keep the mass 12 centered within its range of motion. When the structure to be controlled (and thus the guide) moves with an oscillating movement due to external forces, the mass 12 of the tuned mass damper 10 can move relative to the guide 11.

The mass 12 may have any suitable shape. The representation in FIG. 3 is only schematic.

In case of wind turbines, the mass 12 may be e.g. 2-4% of the effective modal mass of the mode of interest to be damped.

The mass 12 may be coupled to a support structure (not shown) forming part of the structure to be controlled. The coupling between the support structure and the mass 12 may be performed using a suspension element 14 e.g. a suspension rod or a suspension wire that allows the mass 12 to roll over the guide 11 using the rotating elements 13 in a motion. In some examples, the suspended mass 12 may be suspended in plurality of substantially stiff suspension rods, in a plurality of suspension wires or in a combination thereof.

In some examples, the tuned mass damper 10 may further comprise a locking mechanism for locking the tuned mass damper in a desired position along the guide 31.

In further examples, the mass 12 may at least be partly encapsulated in a container. The container may be attached to the support structure and the mass 12 may be attached to the inner walls of the container. Such a container may protect the mass from corrosion.

For example, the operation of the tuned mass damper 10 in case of an oscillation to be damped in a wind turbine may be as follows: the wind turbine tower may start to oscillate fore-aft due to e.g. gusts of wind. In response to the oscillating wind turbine, the mass 12 may perform a motion along the guide 11 using the rotating elements 13. The oscillations of the wind turbine may thus be effectively damped.

In order to ensure that large excursions of the tuned mass damper in case of extreme vibrations of the structure to be controlled e.g. a wind turbine are avoided, the mass 12 may further comprise a centrifugal brake 150 as hereinbefore described. The centrifugal brake 150 may be operatively coupled with one of the rotating elements 13. In other examples, other braking mechanisms might be used.

In some examples, as shown in e.g. FIGS. 1-3, the centrifugal brake may comprise a rotating assembly 2 with a central shaft 4. Again in FIG. 4, the central shaft of the centrifugal brake may be operatively connected with one of the rotating elements 13 forming part of the tuned mass damper 1. Both the rotating elements 13 and the centrifugal brake 1 may e.g. be mounted on the same axle of shaft. The rotating assembly of the centrifugal brake 1 may thus be set into rotation during the displacement of the rotating elements 13 over the guide 11 in response to an oscillating movement of the structure.

As illustrated before, once the rotating elements reached a sufficiently high speed, the brake shoes of the centrifugal brake may engage with a braking surface. This slows down the centrifugal brake and, due to the operative connection with the rotating elements, these rotating elements 13 and the mass 12 are slowed down as well.

The braking surface may be e.g. a fixed surface of a non-rotating part 190 of the tuned mass damper or of the centrifugal brake. Alternatively, the brake shoes 5, 10 may contact the braking surface 11a of the rail 11.

It is thus clear that in all the examples by providing a the tuned mass damper 10 with a centrifugal brake 150 which may be configured to be deployed when the rotational speed of the rotating assembly is above a predefined deployment/engagement speed threshold, the tuned mass damper 10 may be slowed down in case of extreme loads in the structure in which oscillations are to be dampened. Thus, the risk of damaging the tuned mass damper by it hitting its surroundings and the risk of damaging the surroundings may be avoided in case of such extreme loads.

Figure 5:
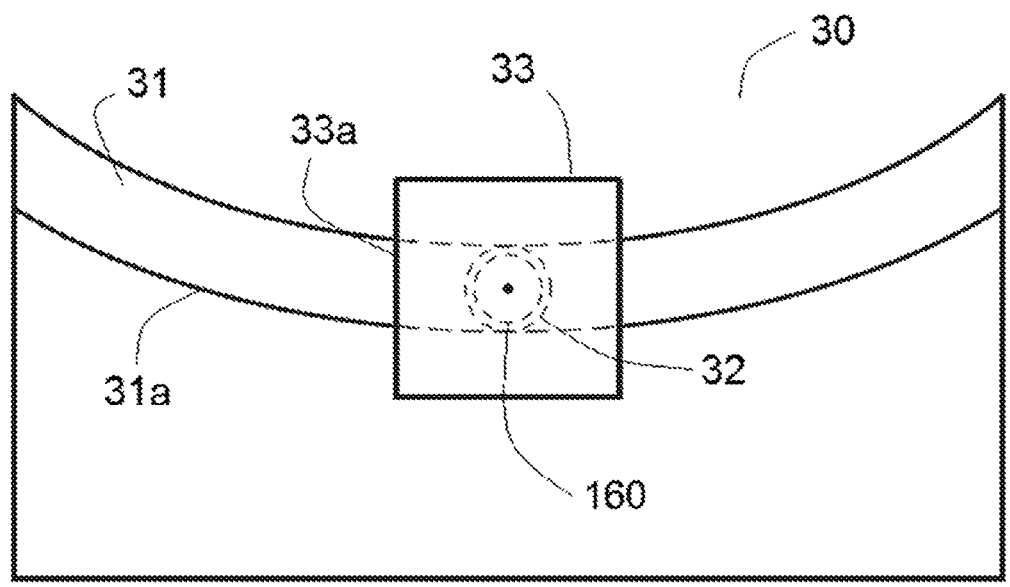
FIGS. 5-7 schematically illustrate a longitudinal cross-sectional view and cross-sectional lateral views of a further example of a tuned mass damper including a centrifugal brake.
Figure 6:
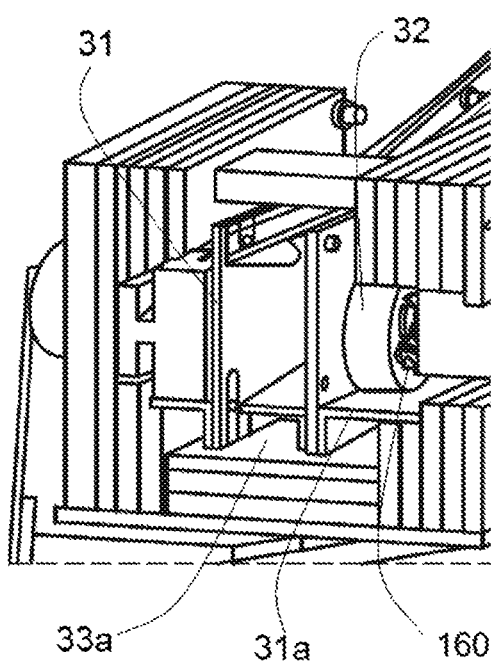
Figure 7:
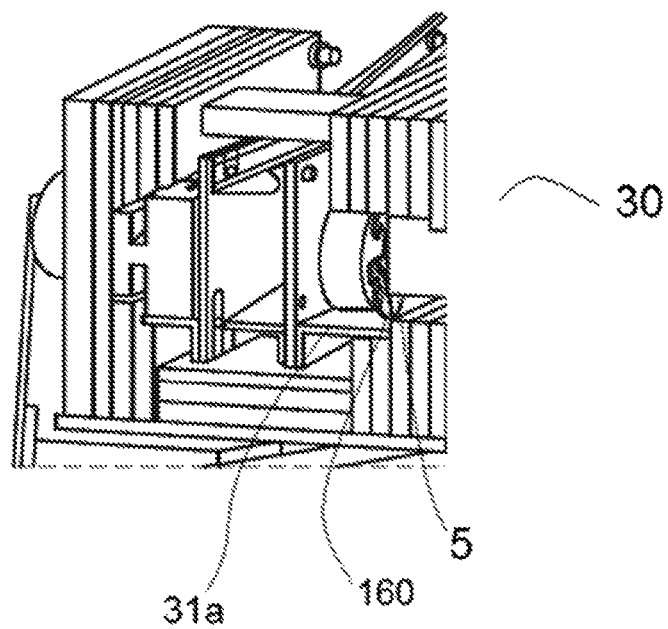

FIGS. 5-7 schematically illustrate a longitudinal cross-sectional view and cross-sectional lateral views of a further example of a tuned mass damper including a centrifugal brake. The centrifugal brake used in the example of FIGS. 5-7 may be the same or similar to the centrifugal brake shown in FIGS. 1-3.

In FIG. 5, a tuned mass damper 30 e.g. a rolling mass absorber may be provided. The tuned mass damper comprises a mass 33 and a rotating element 32 e.g. a roller which in use may be in contact with a guide 31. The rotating element 32 may rotatably be attached to the mass 33. As the rotating element 32 is displaced with respect to a flange 31a of the guide 31, the rotating element is driven and rotates.

The rolling mass 33 may further comprise a through-hole 33a. In use, the guide 31 e.g. a guiding rail may traverse the through-hole 33a such that the rolling mass 33 may be displaced with respect to the guide 31 in a first direction using the rotating element 32 in response to a vibration in a structure.

The guide 31 may form an arc-shaped rolling path in a first direction. Similarly as in previous examples, the guide 31 may be fixed to a structure in which oscillations are to be dampened e.g. a wind turbine tower.

In some examples, the tuned mass damper 30 may further comprise a locking mechanism for locking the tuned mass damper in a desired position along the guide 31.

When the structure e.g. a wind turbine tower (and thus the guide 31 attached to the structure) moves with an oscillating movement due to external forces, the rotating element 32 is rolled along the flange 31a. The rolling mass 33 of the tuned mass damper is thus moved relative to the guide 31 in a first direction, wherein the guide 31 traverses the through-hole 33a. The vibrations of the structure to be controlled are thus damped.

For the previously commented reasons, the tuned mass damper 30 may further comprise a centrifugal brake 160 as hereinbefore described. In FIG. 6, the centrifugal brake is depicted in "armed" position. In case of extreme loads, the centrifugal brake is deployed, as show in FIG. 7.

In some other examples, the centrifugal brake 160 may be the same or similar to the one shown in FIG. 3. In this example, once an "engaged" position of the centrifugal brake 160 is reached, the brake shoes may contact the non-rotating part 190 instead of the rail.

In all the examples the tuned mass damper is slowed down.

Figure 8:
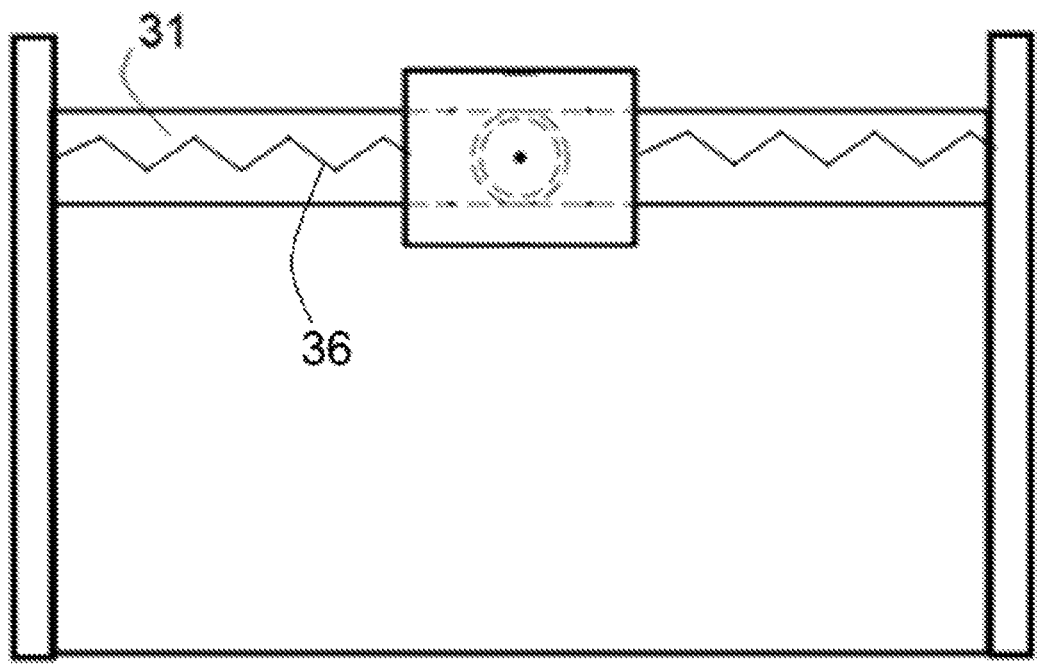
FIG. 8 shows schematically another example of a tuned mass damper including a centrifugal brake.

FIG. 8 shows schematically another example of a tuned mass damper including a centrifugal brake. The centrifugal brake may be the same or similar to the centrifugal brake shown in FIGS. 1-3. The tuned mass damper shown in FIG. 8 differs from the tuned mass damper shown in FIGS. 5-7 only in that the guide 31 is substantially straight and one spring 36 or other resilient elements may be provided. The springs or other resilient elements can be configured to provide an elastic force in the system instead of the gravity in FIG. 5. The structure and operation of the remaining components of the tuned mass damper may substantially be the same as hereinbefore described.

In all the examples of FIGS. 4-8, the maximum speed (which may be the speed at which the centrifugal brake is triggered) will be reached when the mass is at the bottom and/or center part of the guiding rail so that activation of the centrifugal brake prevents the mass from colliding with e.g. the wind turbine tower wall.

Figure 9:
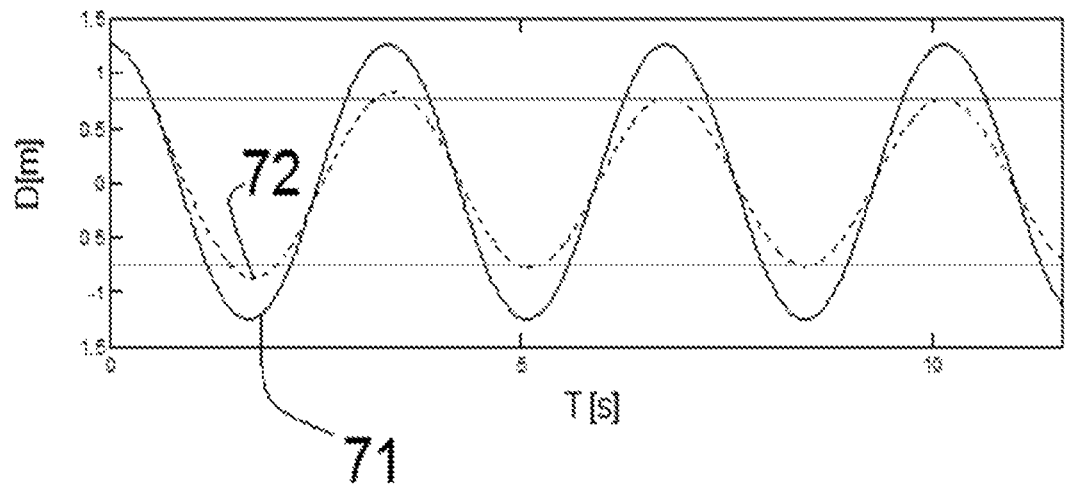
FIG. 9 illustrates the effect of a centrifugal brake on the displacement of a tuned mass damper according to an example.

FIG. 9 illustrates the effect of a centrifugal brake on the displacement of a tuned mass damper according to an example. The centrifugal brake used in the example of FIG. 9 may be the same or similar to the centrifugal brake shown in FIGS. 1-3. The tuned mass damper used in the example of FIG. 9 may be the same or similar to the tuned mass damper shown in FIGS. 5-7.

In FIG. 9, the operation of a tune mass damper with and without centrifugal brake is illustrated in terms of displacement (D[m]), as a function of time (t [s]). The operation of a tuned mass damper in a structure subjected to vibrations without a centrifugal brake may be described as following the curve 71. The curve 71 shows a displacement of the tuned mass damper between approximately +1.25 meters and −1.25 meters in case of a vibrating structure.

However, if a centrifugal brake is operatively coupled with one of the rotatable elements of the tuned mass damper as hereinbefore described, the ability to control extreme excursion of the tuned mass may be increased. Particularly, in this example, the centrifugal brake may be configured to actuate to avoid displacements higher than ±0.75 meters. The curve 72 showing the operation of the tuned mass damper in a structure subjected to vibrations with a tuned mass damper may be the result. The curve 72 shows a displacement of the tuned mass damper between approximately +0.80 meters and −0.80 meters. It is thus clear that the effect of a centrifugal brake is that the displacement of the tuned mass damper is limited when a structure is subjected to extreme loads, thus avoiding the possibility to hit the structure with the tuned mass damper.

Figure 10:
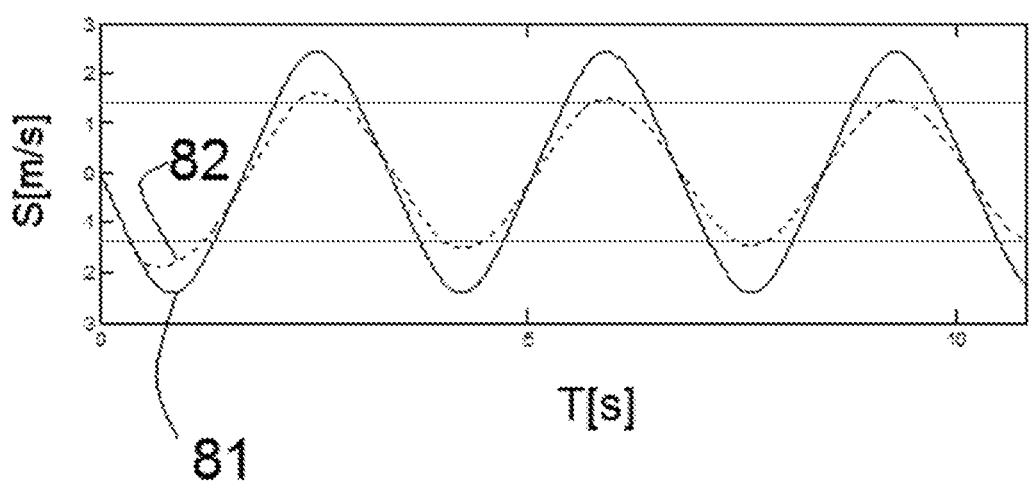
FIG. 10 illustrates the effect of a centrifugal brake on the speed of a tuned mass damper according to an example.

FIG. 10 illustrates the effect of a centrifugal brake on the displacement of a tuned mass damper according to an example. The centrifugal brake used in the example of FIG. 10 may be the same or similar to the centrifugal brake shown in FIGS. 1-3. The tuned mass damper used in the example of FIG. 10 may be the same or similar to the tuned mass damper shown in FIGS. 5-7.

In FIG. 10, the operation of a tune mass damper with and without centrifugal brake is illustrated in terms of speed (S[m/s]), as a function of time (T[s]). The operation of a tuned mass damper in a structure subjected to vibrations without a centrifugal brake may be described as following the curve 81. The curve 81 shows a speed of the tuned mass damper between approximately +2.5 m/s and −2.5 m/s in case of a vibrating structure.

However, if a centrifugal brake is attached to one of the rotatable elements of the tuned mas damper as hereinbefore described, the ability to control extreme excursion of the tuned mass may be increased by reducing the speed of the tuned mass damper. The centrifugal brake may be actuated only for speeds higher than e.g. 1.4 m/s. The curve 82 showing the operation of the tuned mass damper in a structure subjected to vibrations with a centrifugal brake may be the result. The curve 82 shows a speed of the tuned mass damper between approximately +1.5 meters per second and −1.5 meters per second.

In the examples of FIGS. 9 and 10 it may be seen that the highest speed of the tuned mass damper corresponds to the equilibrium point i.e. the point where the displacement of the tuned mass damper is zero. The actuation of the centrifugal brake is performed during displacements of the tuned mass damper at or near the equilibrium position, wherein the rotational speed is maximum.

It will be clear that the displacement and/or speed curves, as a function of time may vary if a different tuned mass damper or a different centrifugal brake is used.

It is noted that in all the examples the higher the motion amplitude is, the higher the speed is and the time the centrifugal brake is actuated is also larger. If the rotational speed is under the threshold set for the centrifugal brake, no actuation of the centrifugal brake is present.

Figure 11:
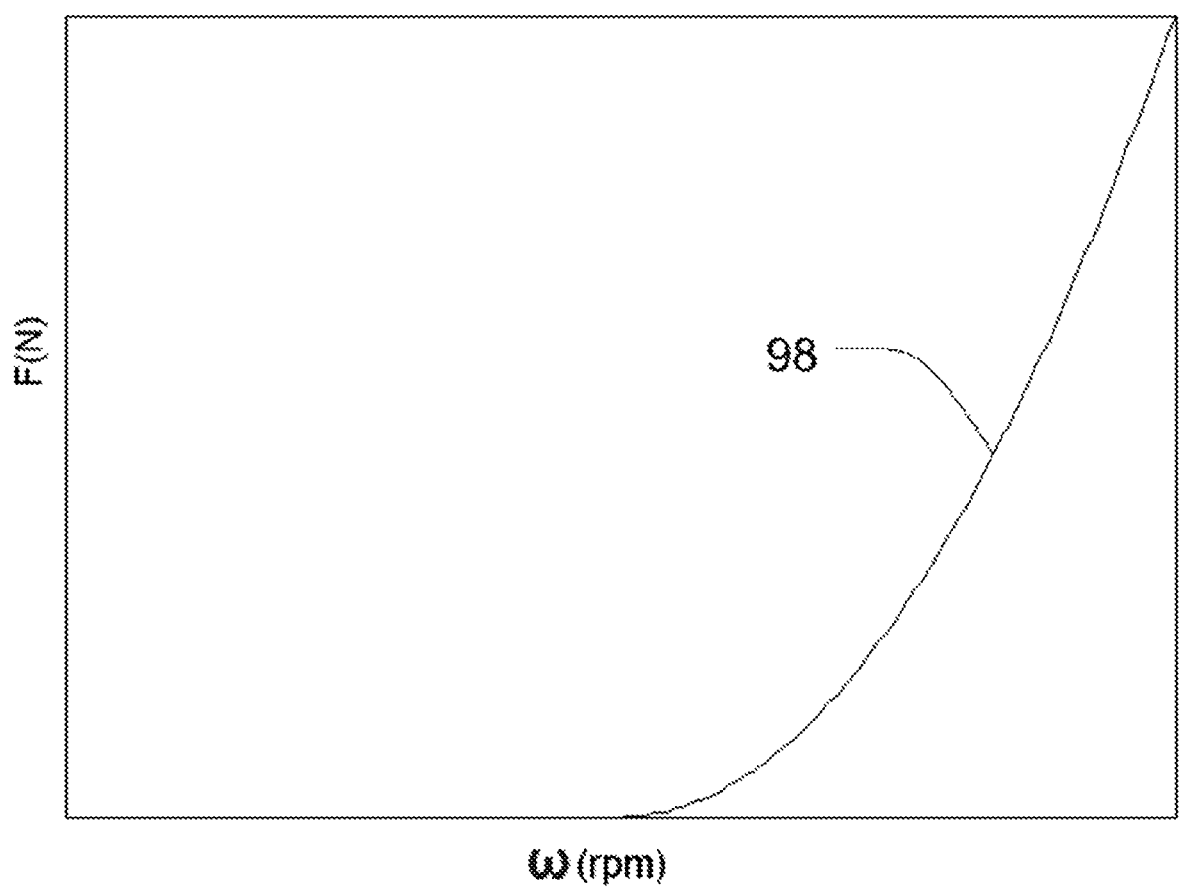
FIG. 11 illustrates a braking force curve of a centrifugal brake, as a function of a rotational speed according to an example.

FIG. 11 illustrates a braking force curve of a centrifugal brake, as a function of a rotational speed according to an example. The centrifugal brake used in the example of FIG. 11 may be the same or similar to any of the centrifugal brakes shown in FIGS. 1-3. The tuned mass damper used in the example of FIG. 11 may be the same or similar to any of the examples of tuned mass dampers shown in FIGS. 4-8.

In FIG. 11, the operation of centrifugal brake forming part of a tuned mass damper is illustrated in terms of braking force (F[N]), as a function of rotational speed (ω[rpm]). The operation of the tuned mass damper in a structure subjected to vibrations with a centrifugal brake may be described as following the curve 98. The curve 98 shows that the centrifugal brake provides a significant braking force only for rotational speeds above a predefined threshold. Once the centrifugal brake actuates, the increase in the centrifugal force exerted by the centrifugal brake is proportional to the rotational speed.

It is thus clear that in all the examples the braking mechanism operates only above a predefined rotational speed and that the force increases in a proportional manner with respect to the rotational speed. In all the examples discussed with reference to the figures, centrifugal brakes are used. However, in other examples, other braking mechanisms may be used that are configured to provide a braking force when the mass exceeds a predefined speed. Such braking mechanisms might be active, i.e. a mechanism is activated using energy or power stored in the braking mechanism in some form upon reaching the predefined speed. In other braking mechanisms, the braking mechanism may be passive, i.e. the braking mechanism is inherently activated by the movement of the mass and does not comprise any specific source of energy or power.

It is noted that the tuned mass dampers described in all the examples cannot only aid damping fore-aft oscillations but can also mitigate loads caused by side-to-side oscillations. The tuned mass dampers described herein may thus be especially advantageous for use in offshore wind turbines which typically are subjected to side-to-side motions (not aligned with wind) due to wave excitations, wherein the side-to-side motions cannot be mitigated by e.g. pitching.

In examples, a rolling mass absorber for damping an oscillating movement of a wind turbine tower along a first direction is provided. The rolling mass absorber comprises a rolling mass arranged to perform a reciprocating movement along the first direction in response to the oscillating movement of the wind turbine tower, wherein the rolling mass comprises a centrifugal brake.

In some other examples, the above-commented centrifugal brake comprises braking elements that are configured to enter into frictional contact with a brake surface such that the movement of the rolling mass along the first direction is at least partially braked.

In further examples, the centrifugal brake comprises one or more rotating elements rotatably coupled to the rolling mass, wherein the centrifugal brake is operatively coupled to the rotating elements.

In examples, a tuned mass damper for damping an oscillating movement of a wind turbine tower along a first direction is provided. The tuned mass damper comprises a mass arranged to perform a reciprocating movement along the first direction in response to the oscillating movement of the wind turbine tower, wherein the mass comprises a centrifugal brake.

In some examples, the centrifugal brake comprises braking elements that are configured to enter into frictional contact with a brake surface such that the movement of the suspended mass along the first direction is at least partially braked.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A tuned mass damper for damping an oscillating movement of a structure along a first direction, comprising:
   a suspended mass arranged to perform a reciprocating movement along the first direction in response to the oscillating movement of the structure, the suspended mass being operationally connected to a support structure using a suspension rod or a suspension wire, wherein the suspended mass is located at one end of the suspension rod or the suspension wire;
   a braking mechanism comprising a centrifugal brake, the centrifugal brake comprising a chassis defining a braking surface and at least one brake shoe secured to the chassis via a pin, the at least one brake shoe secured to the pin via a spring and being rotatable about a pivot point at a distal end of the spring,
   wherein the centrifugal brake is configured to at least partially brake the reciprocating movement of the mass along the first direction when the mass exceeds a predefined speed by allowing the at least one brake shoe to rotate about the pivot point and contact the braking surface when a force on the spring increases due to centripetal acceleration of the at least one brake shoe.

2. The tuned mass damper according to claim 1, further comprising a guide to guide the mass in the reciprocating movement along the first direction.

3. The tuned mass damper according to claim 2, wherein the guide is fixed to the structure.

4. The tuned mass damper according to claim 3, wherein the guide is welded or bolted to an inner surface of a sidewall of the structure.

5. The tuned mass damper according to claim 2, wherein the braking surface forms part of the guide.

6. The tuned mass damper according to claim 2, wherein the braking surface comprises a non-rotating part forming part of the tuned mass damper or the braking mechanism.

7. The tuned mass damper according to claim 2, further comprising one or more rotating elements rotatably coupled to the mass, wherein the braking mechanism is operatively coupled to the rotating elements.

8. The tuned mass damper according to claim 7, wherein the rotating elements are arranged to be driven by the reciprocating movement of the mass along the first direction with respect to the guide.

9. The tuned mass damper according to claim 2, wherein the mass comprises a through-hole and the guide is a guiding rail for traversing the through-hole, wherein the mass is arranged to be displaced along the guiding rail in the reciprocating movement.

10. A rolling mass absorber for damping an oscillating movement of a tower along a first direction, comprising:
    a suspended rolling mass arranged to perform a reciprocating movement along the first direction in response to the oscillating movement of the tower, the suspended rolling mass being operationally connected to a support structure using a suspension rod or a suspension wire, wherein the suspended rolling mass is located at one end of the suspension rod or the suspension wire, wherein the suspended rolling mass comprises a centrifugal brake, the centrifugal brake comprising a chassis defining a braking surface and at least one brake shoe secured to the chassis via a pin, the at least one brake shoe secured to the pin via a spring and being rotatable about a pivot point at a distal end of the spring, wherein the centrifugal brake is configured to at least partially brake the reciprocating movement of the suspended rolling mass along the first direction when the suspended rolling mass exceeds a predefined speed by allowing the at least one brake shoe to rotate about the pivot point and contact the braking surface when a force on the spring increases due to centripetal acceleration of the at least one brake shoe.

11. The rolling mass absorber according to claim 10, wherein the centrifugal brake comprises braking elements that are configured to enter into frictional contact with a brake surface such that the movement of the suspended rolling mass along the first direction is at least partially braked.

12. The rolling mass absorber according to claim 10, further comprising one or more rotating elements rotatably coupled to the suspended rolling mass, wherein the centrifugal brake is operatively coupled to the rotating elements.

* * * * *